July 1, 1969 M. E. NEUMANN ET AL Re. 26,622
SYNCHRONOUS MOTOR CONTROL CIRCUIT
Original Filed July 16, 1964
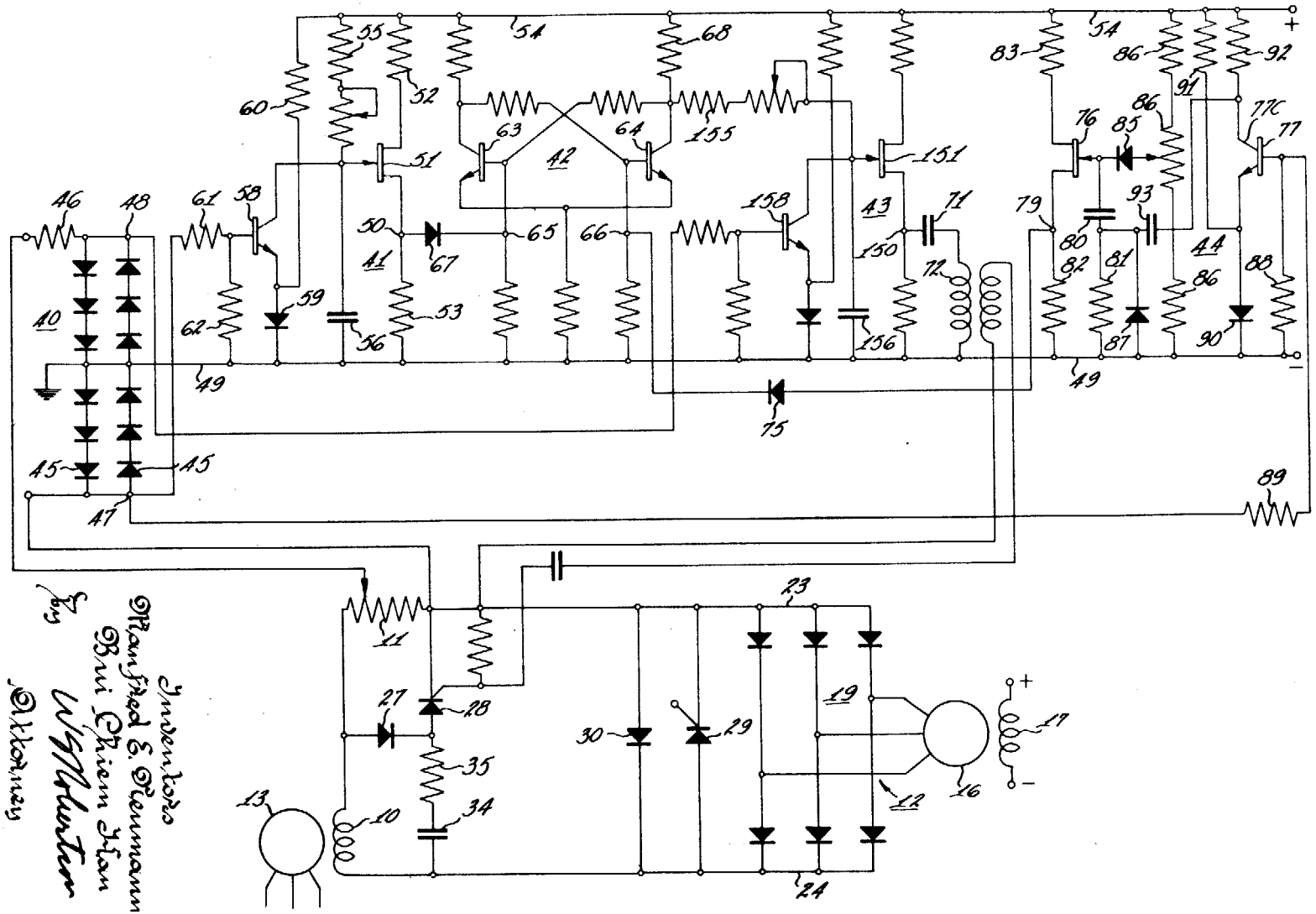
Inventors
Manfred E. Neumann
Bui Chiem Han
By W. S. Robertson
Attorney United States Patent Office Re. 26,622
Reissued July 1, 1969

26,622

SYNCHRONOUS MOTOR CONTROL CIRCUIT

Manfred E. Neumann, New Berlin, Wis., and Bui Chiem Han, Pacific Grove, Calif., by Allis-Chalmers Manufacturing Company, Milwaukee, Wis., a corporation of Delaware, assignee Original No. 3,308,362, dated Mar. 7, 1967, Ser. No. 383,022, July 16, 1964. Application for reissue Mar. 26, 1968, Ser. No. 718,271

Int. Cl. H02p *5/28*

U.S. Cl. 318—176 10 Claims

Matter enclosed in heavy brackets [ ] appears in the original patent but forms no part of this reissue specification; matter printed in italics indicates the additions made by reissue.

*ABSTRACT OF THE DISCLOSURE*

*A control circuit that applies excitation to a synchronous motor when it is near synchronous speed has: (1) a first timing circuit that starts its timing cycle at the beginning of each positive half period of induced field current but runs through a complete timing cycle and provides an output pulse only when the rotor has reached synchronizing speed; (2) a flip-flop set in response to such output pulse; (3) an AND gate which is open when the flip-flop is set and the rotor reaches a position to produce the first negative half cycle after the flip-flop is set; and (4) a second timing circuit enenergized when the AND gate is opened and, after a predetermined time delay indicating that the motor is in an appropriate position relative to the armature M.M.F., providing a gating pulse to an SCR to connect the exciter to the field winding of the synchronous motor.*

This invention relates generally to motor controls, more specifically to a control for starting a synchronous motor.

A synchronous motor of the type using this control has a stationary armature winding energized with polyphase alternating current and a field winding that is mounted on a rotor and is excited from a direct current source. After the motor has been accelerated to its synchronizing speed, a control connects the exciter to energize the field winding and the field winding then synchronously follows the rotating ampere turns of the armature. These motors usually have squirrel cage windings on the rotor that cooperate with the armature winding for accelerating to the synchronizing speed.

While the motor is below synchronous speed, the armature and field windings act as a transformer and a voltage appears in the field winding that alternates at a frequency (called the slip frequency) that is a linear function of the difference between the armature supply frequency and the rotor speed (expressed as angular velocity in electrical degrees). Because the turns ratio between the armature winding and the field winding is high, the open circuit voltage induced in the field winding would greatly exceed the voltage applied to the field winding by the exciter. The starting control short circuits the field winding during acceleration to distribute the induced field voltage through the winding as impedance drops. Ordinarily the field winding is short circuited through an appropriate resistor. A general object of this invention is to provide a new and improved control for measuring the speed of the motor and removing the short circuit on the field and connecting the field winding to its exciter at the synchronizing speed.

Some well known controls respond to the field winding induced current wave form to sense when the motor speed and the angular relationship between the rotor and the armature M.M.F. is appropriate for applying field excitation. Usually these controls include timing circuits that first measure the length of half periods of induced field current to sense when the motor is at synchronizing speed; then in a subsequent half cycle the control generates a signal that delays applying the excitation long enough for the rotor to move to the appropriate angular position with respect to the stator M.M.F. Controls of this type encounter a problem when the motor load is light enough that the reluctance torque established by the armature winding and the residual magnetism of the iron core of the rotor pulls the motor into synchronism before excitation is applied. In this situation the induced field voltage, which provides the motor speed signal, disappears before the control has connected the field winding to the exciter. Some controls have separate circuits that sense this condition and then apply field excitation. A more specific object of this invention is to provide a new and improved control that applies excitation to a synchronous motor either at predetermined subsynchronous speed or after the motor has synchronized without excitation. Because the field excitation may be applied either at subsynchronous speed or synchronous speed, the term "synchronizing speed" will be used to mean any speed at which the excitation is applied.

The control of this invention uses time signal generating circuits that are connected to operate as oscillators. Except when the motor synchronizes without excitation, one of these circuits is controlled in response to the induced field current to begin a timing cycle at the beginning of each period of the induced field current wave form but to run through a complete timing cycle only when the motor has reached its synchronzing speed. In a subsequent half cycle another oscillator is controlled to produce a signal at the end of its timing period to indicate that the rotor is in the appropriate position with respect to the armature M.M.F. to apply excitation. Whenever the motor synchronizes without excitation, the two oscillators respond to the absence of an induced field current signal to run freely and to operate the control through its normal sequence and apply the excitation to the field.

The drawing and the detailed description of the invention will suggest problems in providing the control and corresponding features of the control of this invention.

In the drawing the single figure is a schematic of a synchronous motor, an exciter and the control of this invention.

INTRODUCTION

The control of this invention operates to connect the field winding 10 of a synchronous motor in circuit with a discharge resistor 11 while the motor is below synchronizing speed and to short circuit the resistor and connect an exciter 12 to energize field winding 10 when the rotor that carries the field winding has the appropriate speed and position with respect to the rotating M.M.F. of the motor armature winding 13. Preferably, exciter 12 includes an armature winding 16 mounted on the motor shaft and a stationary field winding 17. Rotation of armature winding 16 within the magnetic field of winding 17 produces an alternating voltage at the exciter armature terminals, and a rectifier 19 is connected to provide a polarity invariant voltage across its terminals 23, 24 for exciting motor field winding 10.

The circuit for short circuiting the field discharge resistor 11 comprises the series combination of a diode 27 and a controlled rectifier 28. Diode 27 and controlled rectifier 28 have other functions that will be described later; these components are introduced now to help explain the current and voltage polarities in the circuit; notice that when diode 27 and controlled rectifier 28 are turned on they connect exciter 12 to energize field winding 10 with exciter terminal 23 negative and terminal 24 positive and with a clockwise current loop in the circuit of field winding 10.

During subsynchronous operation, an alternating polarity voltage is induced in motor field winding 10. The half cycle in which the induced field current is the same polarity as the normal excitation current will be called the positive half cycle and the opposite polarity half cycle will be called negative. During acceleration, when field winding 10 acts as a voltage source and resistor 11 acts as a load, the voltage polarities have the opposite relation to current polarities as during synchronous operation when exciter 12 is a source and winding 10 is a load; terminal 23 is positive with respect to terminal 24 on positive half cycles and negative on negative half cycles.

A switch comprising a controlled rectifier 29 and a diode 30 is provided to connect discharge resistor 11 to short circuit field winding 10 and also to short circuit exciter terminals 23, 24 to prevent applying excitation to the field during acceleration. Exciter 12 is provided with sufficient impedance to limit its short circuit current to a safe value.

Diode 30 is connected across exciter terminals 23, 34 in a polarity to turn off during synchronous operation (when terminal 23 is negative and 24 is positive) and to conduct on positive half cycles of induced field current. Thus, diode 30 switches automatically from subsynchronous to synchronous operation as field winding 10 becomes a load instead of a source.

Controlled rectifier 29 is connected to conduct as a load on both field winding 10 and exciter 12 during negative half cycles of induced field current. Controlled rectifier 29 is selected to have a volt-ampere characteristic to begin conducting between its anode and cathode terminals when the negative half cycle of induced voltage rises above a predetermined low value. This can be accomplished whether or not the gate terminal 29 is energized. Controlled rectifier 29 turns off during the positive half cycle of induced field current in response to the reverse voltage across its anode and cathode terminals. At nearly synchronous speed, exciter 12 tends to maintain controlled rectifier 29 on and diode 30 off continuously.

For synchronization, field winding 10 should receive excitation during the positive half cycle; however, to allow for the delay in applying excitation associated with the circuit time constants, switch 29, 30 is opened during the negative half cycle. This presents a problem of turning off controlled rectifier 29; the circuit for turning off controlled rectifier 29 will be described next.

Diode 27 and controlled rectifier 28 form part of a circuit that turns off the control rectifier 29 when controlled rectifier 28 is turned on at the selected point in the negative half cycle by a rotor speed and position sensing circuit that will be described later. Controlled rectifier 28 has its gate terminal connected through an appropriate resistor to its cathode terminal and the rotor speed and position sensing circuit is connected to produce a current pulse in the gate-cathode circuit. The turn-off circuit also has a capacitor 34 and a resistor 35 that cooperate with diode 27 to connect the capacitor to be charged by field winding 10 during positive half cycles of induced field voltage. When controlled rectifier 28 is turned on, it connects capacitor 34 and resistor 35 across the anode-cathode terminals of controlled rectifier 29 in the appropriate polarity to turn off controlled rectifier 29. Capacitor 34 has the appropriate capacitance in relation to the charging voltage developed across winding 10 (which may be about 1000 volts) to provide a current pulse of sufficient height and width to turn off controlled rectifier 29. At the same time the parallel connected circuits of rectifier 19, diode 30 are connected to winding 10 in series with diode 27 and controlled rectifier 28. Resistor 35 has the appropriate resistance to limit the charging current in the circuit of field winding 10, diode 27 and capacitor 34 and to widen the current pulse sufficiently for turning off controlled rectifier 29. During the first few positive half cycles of induced field current, diode 27 turns on to charge capacitor 34; and it turns off when capacitor 34 has been charged to a voltage greater than the voltage across winding 10.

THE ANGLE AND SPEED SENSING CIRCUITS

Introduction.—The angle and speed sensing circuit is connected to resistor 11 to receive a measure of the induced field current wave form, and at the appropriate space and rotor position it produces a gating pulse to turn on controlled rectifier 28. It comprises the following component groups:

(1) A clipping circuit 40 that converts the sinusoidal wave form of field current to a rectangular wave form that preserves the phase and polarity information in the field current wave form;

(2) A first timing circuit 41 that produces an output when the induced field current (specifically the positive half cycle) reaches a predetermined half period that corresponds to a motor synchronizing speed;

(3) A memory device, flip-flop 42, that is connected to time measuring circuit 41 to be set when the motor reaches synchronizing speed;

(4) A second timing circuit 43 that is controlled by flip-flop 42 and by a field polarity sensing circuit to start its timing sequence at the beginning of the first negative half cycle after flip-flop 42 is set; circuit 43 is connected to gate controlled rectifier 28 at the end of its timing sequence; and (5) A reset circuit 44 for resetting flip-flop 42 to be ready for a new starting operation.

The clipping circuit 40 comprises two strings of diodes 45 connected in series with a resistor 46 across a portion of discharge resistor 11. The two strings of diodes are connected to conduct in the opposite directions and only a small voltage appears across the outer diode terminals 47, 48, corresponding to the sum of the low forward voltage drops of diodes 45. The center point 49 of the diode string forms a point of reference potential for the circuit. Resistor 46 and diodes 45 are given the appropriate resistance and forward resistance respectively to produce between terminals 47, 48 and common terminal 49 sufficient votlage magnitude for other components of the circuit to distinguish between positive half cycles, negative half cycles, and zero voltage.

With respect to common terminal 49, opposite polarity rectangular wave forms appear at terminals 47, 48. During the positive half cycle of induced field current, terminal 47 is negative and terminal 48 is positive with respect to terminal 49.

The first timing circuit 41 is connected to run during the positive half cycle of induced current wave form and to be reset during the negative half cycle. When the positive half period becomes long enough, circuit 41 completes its timing cycle and produces a pulse between terminal 50 and common terminal 49. The timing circuit comprises a unijunction transistor 51 having its two base terminals connected by a resistor 52, 53 between common terminal 49 and a point of positive potential 54. Point 54 is maintained positive with respect to point 49 by a suitable voltage source such as a rectifier and current transformer coupled to excited armature winding 16. The series combination of a resistor 55 and a capacitor 56 are connected to control the potential at the emitter terminal of unijunction transistor 51 according to the charge on capacitor 56. As the timing circuit has been described so far (that is, neglecting the circuit connecting transistor 51 to respond to the field current wave form) capacitor 56 would repeatedly charge in series with resistor 55 to a voltage at the emitter terminal of transistor 51 to turn on transistor 51; transistor 51 would then discharge capacitor 56 in circuit with its base-1 resistor 53 and thereby produce a voltage pulse at terminal 50.

At NPN transistor 58 is connected to reset capacitor 56 during each negative half cycle of induced field current. Transistor 58 has its collector terminal connected to the common connection of capacitor 56 and the emitter terminal of transistor 51 and has its emitter terminal connected to a point of reference biasing potential established by the series combination of a diode 59 and a resistor 60 connected between points 49, 54. The combination of a resistor 61 and a resistor 62 connects the base terminal of the transistor 53 to respond to the wave form between points 47 and 49.

At the beginning of each negative half cycle when point 47 is positive, transistor 58 turns on and discharges capacitor 56 in circuit with diode 59. At the beginning of the positive half cycle when terminal 47 is negative, transistor 58 is turned off and capacitor 56 begins charging in circuit with resistor 55. At low motor speed, the half periods are shorter than the period of oscillation of transistor 51 and transistor 58 is turned on again at the beginning of the next negative half cycle before capacitor 56 has been charged sufficiently to turn on transistor 51. When the motor reaches a preselected speed, the half period is long enough for capacitor 56 to charge sufficiently to turn on transistor 51 and produce a pulse at output 50. This pulse means that the motor is up to speed and that the field excitation can be applied when the rotor reaches the proper position with respect to armature.

The flip-flop 42 is conventional with two transistors 63, 64 connected to have a set input 65 and a reset input 66. A diode 67 connects set input 65 to receive the positive pulse at terminal 50 to turn on transistor 63 and thereby turn off transistor 64 so that the potential of point 54 appears at the collector terminal of transistor 64 (except for a voltage drop across collector resistor 68 associated with other circuits connected to the collector terminal).

The second timing circuit 43 is similar to the first timing circuit 41 and corresponding elements have the same numbers in a 100 series. The connections of this timing circuit to the outer circuit groups are different. Whereas the RC timing circuit 55, 56 of first timing circuit 41 is connected to voltage source 49, 54, to be energized continuously, the RC circuit 155, 156 of second timing circuit 43 is connected to the output of flip-flop 42 to be energized only when flip-flop 42 is set; that is, when the motor has reached synchronizing speed. NPN transistor 158 has its base terminal connected to point 48 to be turned on during positive half cycles and to be turned off during negative half cycles. When transistor 158 is on, it prevents capacitor 156 from being charged. Thus, flip-flop 42 and transistor 158 form an AND gate that start a timing cycle when the motor has reached synchronizing speed and the rotor has reached a position of negative going zero amplitude induced field current. This point is a reference position, and a predetermined time after the motor reaches this point, transistor 151 turns on and produces a pulse at its output 150.

A capacitor 71 and a transformer 72 couple output 150 to controlled rectifier 28 to turn it on when second timing circuit 43 completes its cycle.

Reset circuit 44 is connected by a diode 75 to pulse reset input 66 of flip-flop 42 to reset the flip-flop at the beginning of each positive half cycle. The reset pulse is short enough to not interfere with the set pulse at input 65 which is produced toward the end of a positive half cycle and it does not interfere with the set pulse at input 65 which is produced toward the end of a positive half cycle and it does not interfere with operation of flip-flop 42 during the negative half cycle when second timing circuit 43 operates. Reset circuit 44 comprises a unijunction transistor 76 and an NPN type transistor 77 that is connected to control unijunction transistor 76 to produce appropriately timed pulses at its output 79. The series combination of a capacitor 80 and a resistor 81 is connected between the emitter terminal of transistor 76 and reference potential point 49 to control the potential at the emitter terminal according to the charge on capacitor 80 and the current of resistor 81. Resistors 82, 83 connect the two base terminals of transistor 76 to reference point 49 and to positive potential point 54. A diode 85 connects the emitter terminal of transistor 76 and the associated terminal of capacitor 80 to a point of potential established by a voltage dividing array of resistors 86 that is just slightly less than the voltage required to trigger transistor 76. As will be explained next, transistor 77 is controlled to produce a pulse across resistor 81 to trigger transistor 76 at the beginning of the positive half cycle. When transistor 76 is triggered, it discharges capacitor 80 across resistor 82 to produce the reset pulse at point 79; a diode 87 is connected to bypass resistor 81.

Transistor 77 has its base terminal connected to reference potential point 49 by a resistor 88 and to terminal 47 by a resistor 89. It has its emitter terminal connected to a point of reference potential established by the series combination of a diode 90 and a resistor 91 so that transistor 77 turns off in response to the negative potential at point 47 during the positive half cycles of induced field current. A resistor 92 connects the collector terminal 77c to positive potential point 54 and during the positive half cycles the collector terminal is made positive as transistor 77 turns off. A capacitor 93 couples collector terminal 77c to the common connection of resistor 81 and capacitor 80 so that the positive going change at collector terminal 77c appears across resistor 81 and triggers transistor 76.

Operation.—In the ordinary starting sequence, first timing circuit runs through its timing sequence and produces a pulse at its output 50 when the motor is running fast enough that a positive half cycle is longer than the period of the relaxation oscillator of circuit 41. When flip-flop 42 is set by the pulse at output 50, it cooperates with transistor 158 to run second timing circuit 43 through its cycle to produce a gating pulse for controlled rectifier 28.

The next time motor 10, 13 is started, or if it falls out of synchronism, reset circuit 44 resets flip-flop 42 to prevent second timing circuit 43 from turning on controlled rectifier 28 until synchronizing speed is reached. The component groups of the control are arranged so that even though flip-flop 42 is intially set and second timing circuit 43 is free to run, it cannot turn on controlled rectifier 28 below synchronizing speed. During the negative half cycles of induced field current controlled rectifier cannot turn on because field winding 10 applies a reverse voltage across the anode and cathode terminals of controlled rectifier 28. During the positive half cycle transistor 158 turns on and prevents second timing circuit 43 from running through its timing cycle.

The operation of the control is somewhat different when the motor pulls into synchronism before field excitation is applied. Because controlled rectifier 29 remains on during both negative and positive half cycles as the motor approaches synchronizing speed, a zero voltage signal appears across resistor 11 and at terminals 47, 48 with respect to terminal 49. This situation does not immediately affect second timing circuit 43 because flip-flop 42 remains reset. First timing circuit 41 however begins running through its timing cycle and then sets flip-flop 42 which makes second timing circuit 43 start its timing cycle. At the end of its timing cycle, second circuit 43 turns on controlled rectifier 28 to connect exciter 12 to field winding 10.

Other embodiments.—Although the control has been described as it is applied to a motor with a specific brushless excitation system, the control can also be used with various other excitation systems including systems in which the control and the exciter are not mounted on the rotor but are coupled to the field winding through slip rings. The principles of the illustrated control also apply to controls which sense the motor speed and position by means of tachometer generators, for example from the wave form of exciter armature winding 16. Those skilled in the art will recognize within the scope of the claims and the spirit of the invention other modifications in the design and application of the specific circuit described.

Having now particularly described and ascertained the nature of our said invention and the manner in which it is to be performed, we declare that what we claim is:

1. A control for switching the circuit of a synchronous motor field winding and its exciter from a subsynchronous accelerating state to a synchronous operating state when the motor rotor has reached a synchronizing speed and has reached a predetermined angular position with respect to the rotating M.M.F. of the motor armature, comprising, means for providing an electrical signal alternating in polarity with changes in the position of the field winding with respect to the armature, M.M.F., an oscillator having a period that is slightly less than the half period of said polarity varying signal when the motor has reached the minimum range of synchronizing speed values, means connected to receive the polarity varying signal and to control said oscillator to begin a period in response to only a predetermined polarity of zero value of said signal, whereby said oscillator completes a period only when said motor has reached synchronizing speed, a memory device connected to be set in response to the completion of a period by said oscillator, and means connected to be responsive to a selected polarity or zero value of said polarity varying signal and to set condition of said memory device to signal the circuit of the field winding and the exciter to switch to its synchronous operating state.

2. A control according to claim 1 in which said polarity alternating signal has the slip frequency of the motor.

3. A control according to claim 1 in which said selected polarity is opposite to said predetermined polarity.

4. A control according to claim 3 in which said means to signal the circuit of the field winding and the exciter includes a time delay circuit having a predetermined delay correspnoding to the rotation of the field winding from its position at the beginning of a half cycle of said *selected* [other] polarity to a position appropriate for switching the motor to its synchronous operating state, and means responsive to said opposite polarity or zero value of said polarity varying signal and to the set condition of said memory device to set said time delay circuit to signal the circuit of the field winding after said predetermined delay.

5. A control according to claim 1 including means to reset said memory device after the control has operated to switch the field winding circuit to its synchronous operating state.

6. A control according to claim 5 in which said polarity alternating signal has the slip frequency of the motor.

7. A control according to claim 6 in which said reset means comprises means to produce a reset signal and means to prevent resetting said memory device in the interval between the time said memory device is set and the time the motor is switched to its synchronous operating state.

8. A control according to claim 7 in which said reset means is responsive to said polarity varying signal to produce reset pulses at the beginning of half cycles of said *predetermined* [one] polarity.

9. A control according to claim 8 in which said means producing said alternating polarity signal operates to produce a zero output when the motor is in its synchronous operating state and said reset means is responsive to said *predetermined* [one] polarity of said alternating signal or to a zero value following said *selected* [other] polarity.

10. A control according to claim 5 in which said reset means is responsive to said polarity varying signal to produce reset pulses at the beginning of half cycles of said *predetermined* [one] polarity.

References Cited

The following references, cited by the Examiner, are of record in the patented file of this patent or the original patent.

UNITED STATES PATENTS

| | | | |
|---|---|---|---|
| 2,977,519 | 3/1961 | MacGregor | 318—176 X |
| 2,977,520 | 3/1961 | MacGregor | 318—176 X |
| 3,020,463 | 2/1962 | MacGregor | 318—183 X |
| 3,100,279 | 8/1963 | Rohner | 318—176 X |

ORIS L. RADER, *Primary Examiner.*

G. Z. RUBINSON, *Assistant Examiner.*

U.S. Cl. X.R.

318—183, 193